April 9, 1968     M. LEDERER ET AL     3,377,373
PROCESS FOR THE CONTINUOUS MANUFACTURE OF
PEROXYDICARBONATES
Filed May 24, 1965
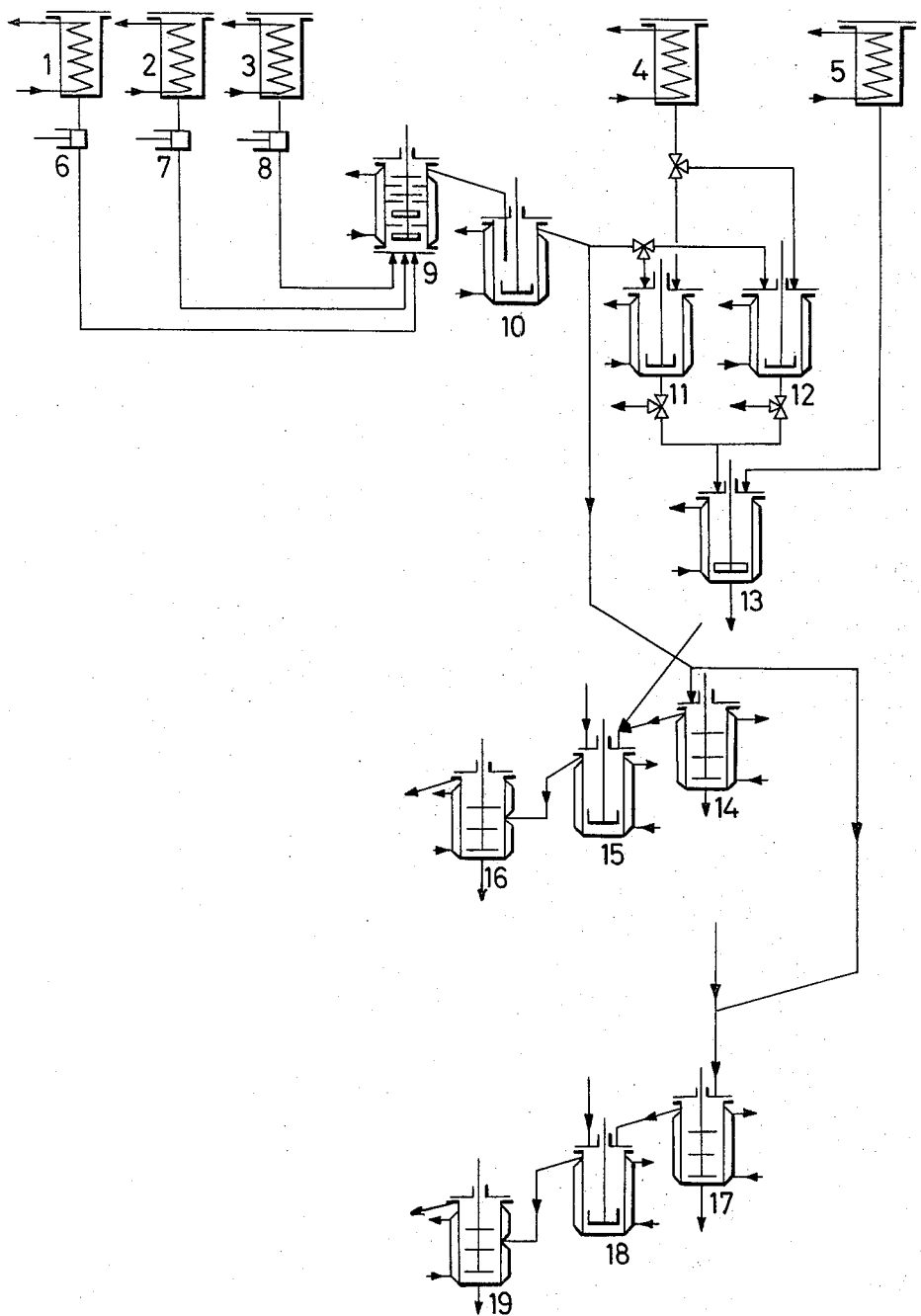
INVENTORS
MICHAEL LEDERER
KARL-HEINZ KASTEN
HELLMUT EBNER
BY *Curtis, Morris & Safford*
ATTORNEYS United States Patent Office 3,377,373
Patented Apr. 9, 1968

3,377,373
PROCESS FOR THE CONTINUOUS MANUFACTURE OF PEROXYDICARBONATES
Michael Lederer, Frankfurt am Main, Germany, Karl-Heinz Kasten, Newark, Del., and Hellmut Ebner, Frankfurt am Main, Germany, assignors to Farbwerke Hoechst Aktiengesellschaft vormals Meister Lucius & Bruning, Frankfurt am Main, Germany, a corporation of Germany
Filed May 24, 1965, Ser. No. 458,042
Claims priority, application Germany, May 22, 1964, F 42,947
3 Claims. (Cl. 260—463)

ABSTRACT OF THE DISCLOSURE

A process for the continuous preparation of peroxydicarbonates by reacting a chlorocarbonic acid ester, hydrogen peroxide and an alkali metal hydroxide solution in a first reaction zone wherein a major portion of the reaction occurs, and then in an after-reaction zone in which a further minor reaction takes place in the presence of an inert hydrocarbon solvent for the peroxydicarbonate reaction product.

The present invention relates to a process and device for the continuous manufacture of peroxydicarbonates.

It is known in industry to initiate the polymerization of unsaturated compounds by means of organic peroxides. However, organic peroxides are sensitive to heat, shock and impact and repeatedly serious accidents occur during their manufacture and application. The stability of the peroxides depends on their constitution and the ratio of carbon atoms to oxygen atoms in the molecule. Peroxides having a low molecular weight are, for example, very unstable. With the stability of an oragnic peroxide there is also connected its activity as polymerization catalyst. In many cases, the aforesaid conditions are the reason why readily decomposable peroxides cannot be used as polymerization catalysts on an industrial scale.

In many polymerization reactions it is desirable to use peroxides which act as an iniator at relatively low temperature and which are available in a form permitting a manipulation on an industrial scale.

Recently, the diesters of peroxydicarbonic acid have gained importance, particularly in the polymerization of ethylene, vinyl chloride and vinyl acetate. They have the great advantage that they can be used in an amount of about 1/10 to 1/50 only of the amounts of peroxides generally used as polymerization catalysts, i.e. they are much more effective than the latter peroxide catalysts. However, they have the drawback of being very sensitive to heat. They must, therefore, be produced with considerable precaution in the discontinuous manner.

It has already been proposed to improve the stability of low molecular weight dialkyl esters of peroxydicarbonic acid by absorbing the peroxides in a discontinuous manufacturing process in hydrogen-free solvents.

It has now been found that peroxydicarbonates of the general formula:

R—O—CO—O—O—CO—O—R in which R stands for a possibly chloro-substituted alkyl or alkenyl group with 1 to 9 carbon atoms can be advantageously prepared by reacting chlorocarbonic acid esters of the general formula:

Cl—CO—O—R in which R has the above meaning, with hydrogen peroxide and alkali metal hydroxide solution at a temperature in the range of from −10° C. to +30° C., when the reactants are reacted for the major part in a first reaction zone at a pH in the range of from 8 to 14, with intense mixing, the dispersion thus obtained is transferred into an after-reaction zone, in which the reaction is terminated, and the peroxydicarbonate obtained is taken up in a hydrogen-free, halogen-containing organic solvent or in a hydrocarbon that is liquid under normal conditions.

The reaction is carried out in a device as shown in the accompanying drawing. The device consists of containers 1 to 5, metering devices 6, 7, and 8, reactors 9 and 10 and processing devices 11 to 19. The containers can be made of glass, enamel or other suitable materials. They are cooled by jacket cooling or by means of installed cooling coils.

The cylindrical reactor 9 made of a suitable material, for example stainless steel, is provided with a jacket through which a cooling brine is conducted. In the bottom of the reactor three inlets are installed for the separate introduction of the starting components. The reactor is subdivided in the way of a cascade by several perforated intermediate bottoms into directly interconnected chambers, preferably three to six. The two lower chambers are provided with two or several high speed stirring means, for example toothed rim impellers, rotor cage impellers or similar high speed impellers, while in each of the other chambers a high speed disk impeller or a low speed perforated blade agitator, an anchor stirrer or an agitator with like effect is installed. The cover of the reactor is provided with a thermometer and means for taking samples.

Recator 9 is connected with reactor 10 which is made of a suitable material and likewise is provided with a cooling jacket. In reactor 10 a stirring means is installed, preferably an impeller or an analogous stirrer. The transfer pipe from reactor 9 to reactor 10 reaches below the level of the liquid in the latter. Reactors 9 and 10 may have the same size or different dimensions. Reactor 10 is connected with separating vessels 11 and 12 and washing vessel 13 in which the reaction mixture is processed in batches. The reaction products can likewise be isolated continuously in series-connected washing vessels 14 to 19. All processing devices are connected with a cooling system.

The three starting components, chlorocarbonic acid ester, aqueous sodium hydroxide solution and hydrogen peroxide are metered in by means of suitable metering devices, advantageously diaphragm or piston pumps, or rotameters. Small amounts, particularly of hydrogen peroxide, can also be metered in by means of calibrated vessels with dropping devices.

The components chloroformic acid ester, aqueous sodium hydroxide solution, preferably having a content of NaOH of 15 to 30% by weight, and hydrogen peroxide of 10 to 60% strength are introduced into reactor 9 at the bottom through pipes from containers 1, 2, and 3 and via metering devices 6, 7 and 8. The components are mixed in a ratio of: 0.9 to 1.1 advantageously 1.0, mols of $H_2O_2$; 2.0 to 2.2, advantageously 2.0, mols of chloroformic acid ester; 1.9 to 2.4, advantageously 2.0, mols of NaOH in the form of an aqueous solution.

The reaction mixture is colloidally distributed by means of stirring devices. The reaction heat is dissipated through the jacket of reactor 9. The temperature of the cooling brine depends on the amount of reaction mixture put through. It is preferably in the range of from 0 to —20° C. The temperature of the reaction mixture is maintained in the range of from 4 to 10° C. and advantageously 6 to 8° C. The pH of the reaction mixture is adjusted to 8–14, preferably 10.5–12.5. After having been reacted in reactor 9, the reaction mixture is transferred to reactor 10 the cooling jacket of which has a temperature of —5 to +8° C., advantageously 0 to +5° C.

The reaction products can be isolated in the form of desensitized solutions by alternately collecting the reaction mixture in vessels 11 and 12, separating the aqueous phase, and taking up the reaction product in the desired, desensitizing solvent. The said solvent is taken from container 4. Suitable solvents are hydrogen-free, halogen-containing compounds such as carbon tetrachloride, monofluorotrichloromethane, trifluorotrichloroethane, tetrafluorodichloroethane, or octafluorocyclobutane. In some cases halogen-free solvents may be used, for example pentane, hexane, heptane, or hydrocarbons of higher molecular weight or terpene derivatives. The organic solvents may be added to the reaction mixture prior to the separation of the aqueous phase.

The solution of the peroxide is subsequently conducted into washing vessel 13 where it is washed with cooled water from container 5.

Alternatively, the reaction products can be isolated continuously in pairs of mixers and separators 14 to 19 in cascade connection. The separating vessels 14, 16, 17 and 19 are provided with slow speed flat paddle agitators while mixing vessels 15 and 18 contain high speed impellers. All vessels are connected with a cooling system like 11, 12 and 13. Vessels 14 to 16 are used when the solvent for the peroxide has a higher specific gravity than water, whereas the series of vessels 17 to 19 is intended for use with solvents having a lower specific gravity than water. The solvents are stored in container 4. With the use of a solvent with higher specific gravity it is conducted into mixer 15, while a solvent with low specific gravity is introduced into separation vessel 17. According to the requirements in each case several pairs of mixers and separators 15/16 or 18/19 can be connected in series, advantageously more than two pairs of such vessels are used.

The washed peroxide solutions are dried with inert drying agents, such as magnesium sulfate or sodium sulfate.

The peroxides are obtained in the form of solutions of about 40 to 50% strength. The advantage of the process of the invention resides in that in a small apparatus decomposable peroxydicarbonates, which represent highly effective catalyst, can be prepared in continuous manner without danger.

The following examples serve to illustrate the invention but they are not intended to limit it thereto.

EXAMPLE 1

A four-stage reactor 9 of stainless steel was used which had a capacity of about 0.8 liter and the stirring shaft of which was provided in the two lower chambers of the reactor with two rotor cages of different diameter and in the upper two chambers with a stirring disk each. The shaft was driven at a speed of 1000 revolutions per minute. The reactor was charged with 206 cc. of chloroformic acid ispropyl ester and 85 cc. of aqueous hydrogen peroxide of 34.6% strength. The cooling jacket of the reactor was fed with a cooling brine having a temperature of —8° C. At a reaction temperature of 5 to 8° C., 365 cc. of aqueous sodium hydroxide solution of 17.4% strength was pumped in over a period of 20 minutes by means of a diapragm pump. Directly thereafter, the three components to be reacted were metered into the reactor at the following rates:

905 cc./hour of chloroformic acid ester.
342 cc./hour of aqueous hydrogen peroxide and
1660 cc./hr. of aqueous sodium hydroxide solution.

The ester was introduced via a piston pump and the hydrogen peroxide was dropped in through a dropping device. The pH value in the reactor was controlled with a glass electrode and maintained at 12 to 12.5. The reaction mixture was passed from reactor 9 through an immersion tube into reactor 10, the cooling jacket of which was cooled with a cooling brine of 0 to —5° C. The second reactor was made of glass and contained an impeller having a speed of 750 rotations per minute.

The reaction mixture was alternately collected in separators 11 and 12, the reaction product was separated from the aqueous phase and conducted into washing vessel 13 with $CCl_4$ from container 4 in an amount such that an about 50% solution was obtained. The desensitized solution of the peroxide was then washed three times with cooled water from container 5.

The separating vessels, containers and washing vessels were cooled with a cooling brine having a temperature of 0 to +5° C.

The peroxide solution was drawn off and dried over anhydrous sodium sulfate.

After a time of operation of 40 hours and 5 minutes 29.02 kilograms of diisopropyl percarbonate were obtained from 40.82 kilograms of chloroformic acid isopropyl ester, corresponding to a yield of 690 grams/hour.

EXAMPLE 2

The reaction was carried out as described in Example 1, with the exception that the throughput was smaller. The components were metered in at the following rates:

678 cc./hour of chloroformic acid isopropyl ester,
268 cc./hour of aqueous hydrogen peroxide of 34.6% strength, and
1200 cc./hour of aqueous sodium hydroxide solution of 17.4% strength.

After a time of operation of 460 minutes 4055 grams of diisopropyl percarbonate were obtained in the form of a solution in $CCl_4$ from 5190 cc. of chloroformic acid isopropyl ester, corresponding to a yield of 517 grams/hour.

We claim:
1. A process for the continuous manufacture of peroxydicarbonate of the formula:

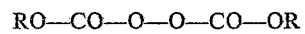

RO—CO—O—O—CO—OR in which R is an alkyl group of 1 to 9 carbon atoms, an alkenyl group of 2 to 9 carbon atoms, a chloroalkyl group of 1 to 9 carbon atoms or a chloroalkenyl group of 2 to 9 carbon atoms, which comprises continuously adding to a first reaction zone and reacting a major part therein, while intimately mixing, a chlorocarbonic acid ester of the formula

Cl—CO—OR hydrogen peroxide and an alkali metal hydroxide in a solution having a pH in the range of from 8 to 14 at a temperature in the range of from —10° C. to +30° C. to form a first reaction product dispersion, continuously transferring said first dispersion from said first reaction zone to a second reaction zone, reacting further in said second reaction zone said ester, said peroxide and said hydroxide to form a second reaction product dispersion, and terminating the reaction in said second reaction zone by continuously mixing said second dispersion with a halogenated alkane of up to 4 carbon atoms or an alkane of 5 to 7 carbon atoms as a solvent for the peroxydicarbonate reaction product in said second dispersion.

2. The process of claim 1, wherein a pH of 10.5 to 12.5 is adjusted in the first reaction zone.

3. The process of claim 1, wherein the reaction product is taken up in carbon tetrachloride.

References Cited

UNITED STATES PATENTS 2,517,964  8/1950  Bissinger _____ 260—453
2,728,756  12/1955  Friedlander _____ 260—453 X

FOREIGN PATENTS 1,371,033  7/1964  France.

CHARLES B. PARKER, *Primary Examiner.*
JOSEPH P. BRUST, *Examiner.*
B. BILLIAN, L. C. MARUZO, *Assistant Examiners.*